United States Patent
Onodera et al.

(10) Patent No.: US 7,886,820 B2
(45) Date of Patent: Feb. 15, 2011

(54) METHOD AND SYSTEM FOR MONITORING THE INCURSION OF PARTICULATE MATERIAL INTO A WELL CASING WITHIN HYDROCARBON BEARING FORMATIONS INCLUDING GAS HYDRATES

(75) Inventors: Shunetsu Onodera, Cheltenham (GB); Hitoshi Sugiyama, Sagamihara (JP); Brian W. Cho, Yokohama (JP); Ahmed H. Al-Jubori, Calgary (CA); Masafumi Fukuhara, Sagamihara (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 627 days.

(21) Appl. No.: 11/612,494

(22) Filed: Dec. 19, 2006

(65) Prior Publication Data

US 2007/0163780 A1    Jul. 19, 2007

Related U.S. Application Data

(60) Provisional application No. 60/752,118, filed on Dec. 20, 2005.

(51) Int. Cl.
*E21B 47/06* (2006.01)
*E21B 43/12* (2006.01)

(52) U.S. Cl. .................. 166/250.07; 166/65.1; 166/68; 166/249; 166/250.11; 166/370

(58) Field of Classification Search ........................ None
See application file for complete search history.

(56) References Cited

U.S. PATENT DOCUMENTS

| 4,499,765 | A | 2/1985 | Benz et al. |
| 6,023,445 | A | 2/2000 | Cook et al. |
| 7,389,787 | B2 * | 6/2008 | Means et al. .................. 137/13 |
| 2003/0038231 | A1 | 2/2003 | Bryant et al. |
| 2005/0199386 | A1 * | 9/2005 | Kinzer ...................... 166/248 |
| 2006/0032637 | A1 | 2/2006 | Ayoub et al. |
| 2006/0191683 | A1 | 8/2006 | Fukuhara et al. |
| 2007/0289740 | A1 * | 12/2007 | Thigpen et al. ........ 166/250.01 |

FOREIGN PATENT DOCUMENTS

| GB | 2408327 A | 5/2005 |
| RU | 2231635 C1 | 6/2004 |
| SU | 1574796 A1 | 6/1990 |
| WO | 2005/033465 A2 | 4/2005 |

OTHER PUBLICATIONS

Williams et al., Methane Hydrate Production From Alaskan Permafrost, Gas Hydrate Project Production Testing; North Pole, Alaska, Topical Report Jan. 1, 2003 to Mar. 31, 2003, DE-FC26-01NT41331, Apr. 2003, pp. 1-6.

Hideaki Takahashi et al., Operation Overview of the 2002 Mallik Gas Hydrate Production Research Well Program at the Mackenzie Delta in the Canadian Arctic; OTC 15124, May 5-8, 2003, p. 1-10.

* cited by examiner

*Primary Examiner*—Zakiya W. Bates
(74) *Attorney, Agent, or Firm*—Daryl Wright; Jody DeStefanis; Jeff Grifflin (57) ABSTRACT

A method and system for monitoring any incursion of particulate matter from a gas hydrate formation into a well casing used for the production of the gas hydrate and determining the degree of incursion of particulate material within the distal end of the well casing.

15 Claims, 7 Drawing Sheets

METHOD AND SYSTEM FOR MONITORING THE INCURSION OF PARTICULATE MATERIAL INTO A WELL CASING WITHIN HYDROCARBON BEARING FORMATIONS INCLUDING GAS HYDRATES

CROSS-REFERENCE TO RELATED APPLICATION

This application relates to and claims the benefit under 35 U.S.C. §119(e) of applicants' U.S. Provisional Application Ser. No. 60/752,118 entitled "Systems and Method for Development of Hydrocarbon Bearing Formations," filed Dec. 20, 2005. The disclosure of this Provisional Application is hereby incorporated by reference as though set forth at length.

BACKGROUND

This invention is generally related to a method and system for monitoring the incursion of particulate matter into a well casing that is designed for recovering hydrocarbons from subterranean formations. In one useful aspect this invention relates to a method and system for detecting and measuring the buildup or accumulation of sand within a well casing operable for producing methane gas from gas hydrate formations A gas hydrate is a crystalline solid that is a cage-like lattice of a mechanical intermingling of gas molecules in combination with molecules of water. The name for the parent class of compounds is "clathrates" which comes from the Latin word meaning "to enclose with bars." The structure is similar to ice but exists at temperatures well above the freezing point of ice. Gas hydrates include carbon dioxide, hydrogen sulfide, and several low carbon number hydrocarbons, including methane. One aspect of this invention is the recovery of methane from subterranean methane hydrates.

Methane hydrates are known to exist in large quantities in two types of geologic formations: (1) in permafrost regions where cold temperatures exist in shallow sediments and (2) beneath the ocean floor at water depths greater than 500 meters where high pressures prevail Large deposits of methane hydrates have been located in the United States in Alaska, the west coast from California to Washington, the east coast in water depths of 800 meters, and in the Gulf of Mexico (other well known areas include, Japan, Canada and Russia).

A U.S. Geological Survey study estimates that in-place gas resources within gas hydrates consist of about 200,000 trillion cubic feet which dwarfs the previously estimated 1,400 trillion cubic feet of conventional recoverable gas reserves in the United States. Worldwide, estimates of the natural gas potential of gas hydrates approach 400 million trillion cubic feet.

Natural gas is an important energy source in the United States. It is estimated that by 2025 natural gas consumption in the United States will be nearly 31 trillion cubic feet. Given the importance and demand for natural gas the development of new cost-effective sources can be a significant benefit for American consumers.

Notwithstanding the obvious advantages and potential of methane hydrates, production of methane from gas hydrates is a challenge for the industry. When trying to extract methane from a gas hydrate the sequestered gas molecules must first be dissociated, in situ, from the hydrate. There are typically three methods known that can be used to create this dissociation.

One method is to heat the gas hydrate formation to liberate the methane molecules. This method is disclosed in United States Patent Application Publication No. US 2006/0032637 entitled "Method for Exploitation of Gas Hydrates" published on Feb. 16, 2006, and of common assignment with the subject application. The disclosure of this publication is incorporated herein by reference as background information with respect to the subject invention.

Another method envisioned for producing methane hydrates is to inject chemicals into the hydrate formation to change the phase behavior of the formation.

A third technique, which is one aspect of the instant invention, is regarded as a depressurization method. This method involves depressurization of a gas hydrate formation and maintaining a relatively constant depressurization on the hydrate formation to allow dissociation and then withdrawing dissociated gas and water through a well casing.

In all of the above mentioned techniques a well casing is used to bring gas and fluids to the surface for separation and processing. Sanding at the distal end of the well casing in methane hydrate production, as well as in conventional oil and gas recovery, will often cause a critical problem. In this, sand can damage completion equipment and in a worst case scenario stop production. Therefore it would be highly desirable to provide a method and system which would be capable of estimating the movement of the sand-fluid interface position within the well casing.

SUMMARY OF THE DISCLOSURE

There are four concepts envisioned in the subject disclosure for addressing sanding within a production casing.

One envisioned method and system comprises installation of two pressure sensors, below a submergible pump at the bottom or distal end of a well casing. By measuring the pressure noise variance between the two pressure sensors, such as phase shift or amplitude change, the height of sand entrapped within a well casing can be estimated.

Another method and system utilizes a continuous thermal characteristics measurement device, such as a distributed temperature sensing system (Hot-DTS). This unit may be installed, for example, below the completion string. By measuring the temperature or thermal characteristics of the surrounding material with the temperature sensing device the position of the sand-fluid interface may be estimated.

Further, an acoustic transmitter and receiver may be installed at, for example, the bottom of the completion string. By observing the waveform of the sound generated and received, the distance between the transmitter/receiver and the sand-fluid interface may be estimated.

Still further a vibrator and vibrating bar may be installed, for example, below the completion string. By observing the vibration mode of the bar, the position of the sand-fluid interface may be estimated.

THE DRAWINGS

Other features and aspects of the disclosure will become apparent from the following detailed description of some embodiments taken in conjunction with the accompanying drawings wherein.

DETAILED DESCRIPTION

Figure 1:
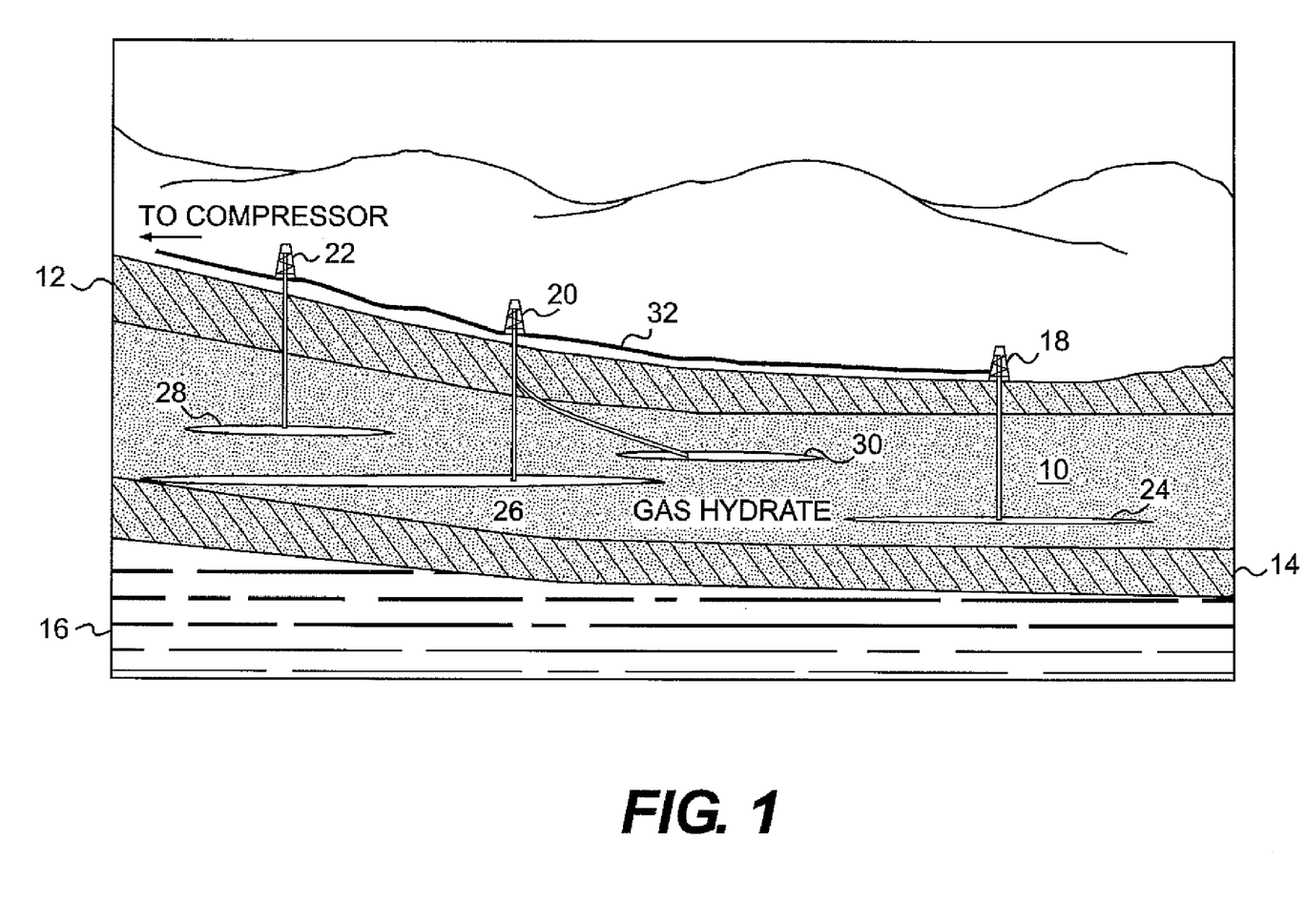
FIG. 1 is a pictorial view of one context or geological region of permafrost in Alaska where gas hydrates are know to exist.

Turning now to the drawings wherein like numerals indicate like parts, FIG. 1 discloses a pictorial representation of one operating context of the invention. In this view a band of gas hydrate 10 lies in a rather shallow geologic zone beneath a permafrost layer 12 such as exists in Alaska. Other earth formations 14 and/or aquifer regions 16 can exist beneath the gas hydrate.

In order to recover sequestered methane gas from within the gas hydrate zone one or more wells 18, 20 and/or 22 are drilled through the permafrost 12 and into the gas hydrate zone 10. Usually a casing is cemented within the well and one or more windows are opened directly into the hydrate zone to depressurize irregular regions of the gas hydrate represented by irregular production zones 24, 26, 28 and 30 extending away from distal terminals of the wells. Although a single well is shown drilled from a single derrick illustrated at 18 and 22 it is envisioned that directional drilling as illustrated at derrick 20 and zone 30 will be a more common practice to extend the scope of a drilling operation.

Once one or more wells are drilled, pressure is relieved from the gas hydrate zone around the well and the methane gas and water molecules will separate and enter the wells. The gas can then be separated from the water and allowed to rise to the surface or is pumped to the surface along with water and separated and fed along a pipeline 32 to a compressor station not shown.

Figure 2:
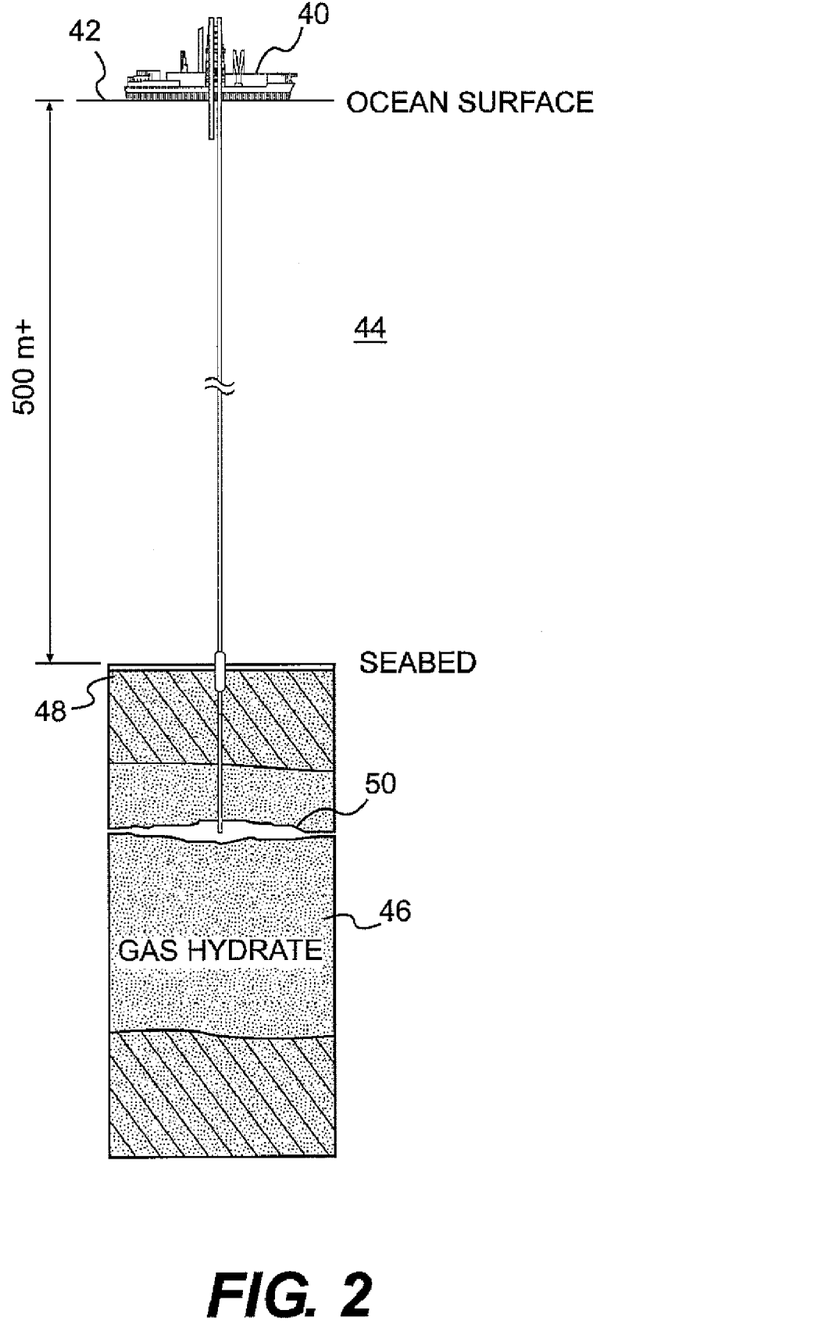
FIG. 2 is a pictorial view of another context or geological region of gas hydrates beneath offshore regions of the United States in water greater than 500 meters.

An alternative operating context of the invention is illustrated in FIG. 2 where a drillship 40 is shown floating upon the surface 42 of a body of water 44 such the Gulf of Mexico. In this marine environment, pressures in water depths approximately greater that 500 meters have been conducive to the formation again of geologic layers of gas hydrates 46, such as methane hydrates, beneath the seabed 48.

Offshore drilling in water depths of 500 meters or more is now technically possible so that drilling into the offshore gas hydrate formations 46 and cementing a casing into a well hole offshore to form a production strata 50 is another source of production of methane from a gas hydrate formation. Again, directional drilling from a subsea template enables fifty or more wells to be drilled from a single drillship location.

Figure 3:
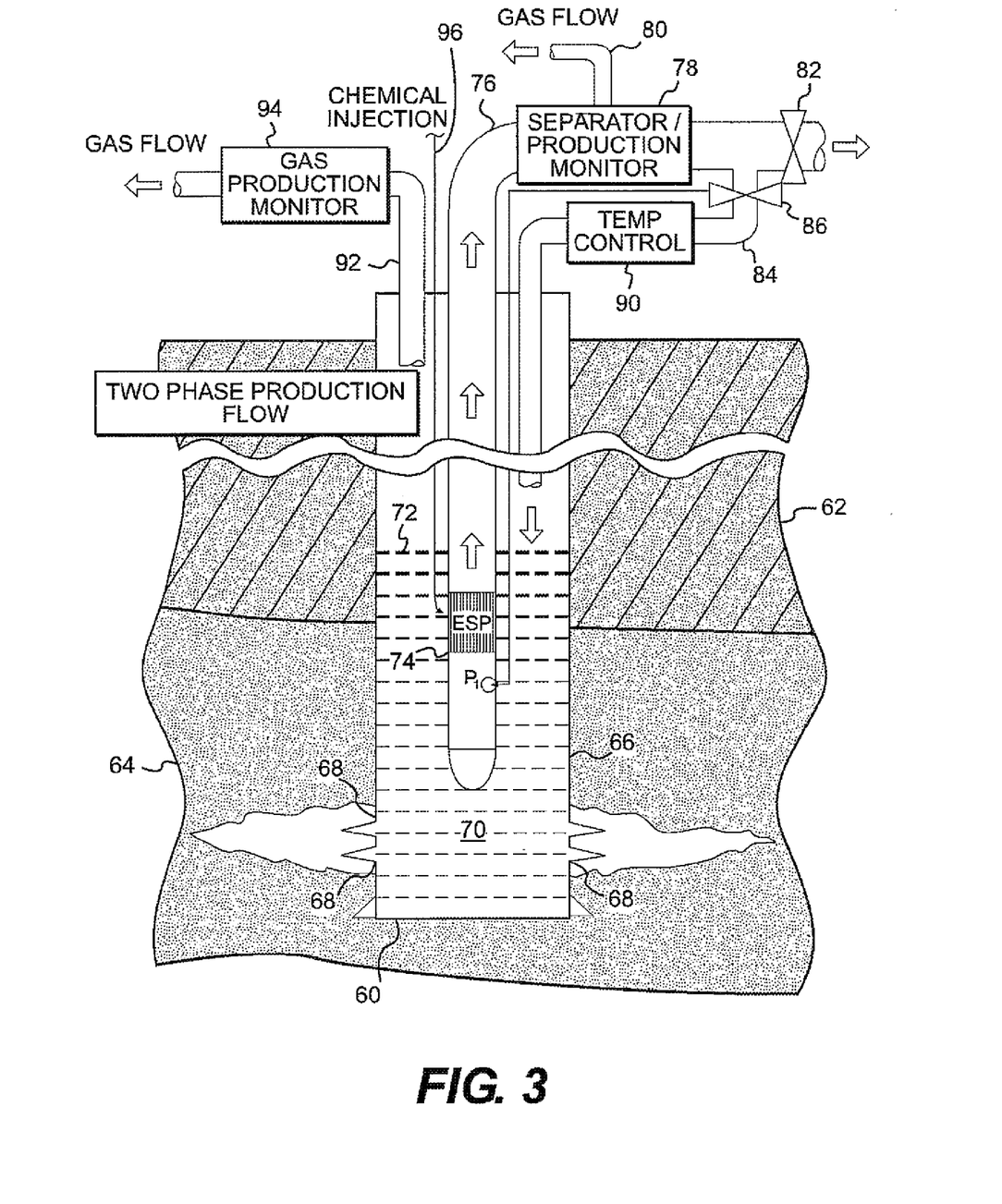
FIG. 3 is a schematic representation of one technique for producing a methane hydrate that includes a depressurization production system including maintaining a desired level of pressure within a well including returning water into the well from a surface valve system.

Turning now to FIG. 3, there will be seen one method and system in accordance with one embodiment of the invention. In this, a well hole 60 is drilled through an earth formation 62 and into a previously identified geologic layer of methane hydrate 64. A casing 66 is positioned within the well and cemented around the outer annulus for production. At a selected depth, which may be relatively shallow for drilling through permafrost or deep if offshore, the casing is perforated by one or more windows 68 which establish open communication between the interior of the well casing and a zone of methane hydrate under pressure. This opening of the well casing will relieve pressure on the surrounding methane hydrate and will enable previously sequestered methane gas to dissociate from the lattice structure of water molecules to form a physical mixture of gas and water. The gas and water 70 will then flow into the well casing 66 and rise to a level 72 within the casing consistent with a desired level of pressure within the well casing. In other words, the submersible pump pumps water out of the well creating a lower hydrostatic pressure on the hydrate to dissociate. Once the hydrate dissociates, the water and gas will flow into the wellbore raising the water level which lowers the drawdown pressure which then tends to prevent further dissociation. This is a self limiting process thus the submersible pump is used to pump out the water within the well casing to lower the water level and to maintain the drawdown pressure necessary for continuous dissociation. The pump creates the drawdown pressure. An automated feedback loop maintains a constant drawdown pressure by re-circulating some amount of produced water.

In order to recover methane gas from the mixture, the gas and water mixture is pumped to the surface by an electro submersible pump (ESP) 74 connected to the distal end of a first conduit 76 extending into the well casing 66.

Some downhole pumps require a minimum amount of flow rate to stabilize pump performance, such as an ESP. Some hydrocarbon reservoirs do not have enough production flow, such as in methane hydrate production wells, to efficiently use a full production ESP. Methane hydrate production flow depends on not only formation permeability, but also on the rate or volume of hydrate dissociation. Accordingly, production rate may change from time to time which may require the pump size to be changed. The present invention endeavors to provide methods and systems that generate the minimum flow rate of fluids for the pump by a flow back loop that may be used to return pumped out fluid back into the well casing to be recycled. In this, it is possible to handle a wide range of production rates with only one large capacity downhole pump.

At the surface the gas and water mixture passes through a conventional gas and water separator 78 where methane gas is separated, monitored and delivered to a pipe 80 for collection by a compressor unit. Downstream of the separator/monitor 78 is a valve 82 to control the flow of water out of the system. Prior to reaching valve 82 a branch or second conduit 84 is joined into the first conduit and extends back into the well casing 66. This enables water from the well that has been separated from the mixture at 78 to be reintroduced back into the well casing to maintain at least a minimum level of water 72 within the well casing for efficient operation of the ESP 74.

Control of the volume of water reintroduced into the well casing is provided by a choke valve 86 that is positioned within the second conduit 84 as illustrated in FIG. 3. The position of the choke valve can be regulated by a control line running from the intake of the ESP to the choke valve 86. This enables the system to maintain a constant pressure within the well casing 66 by controlling the volume of water reintroduced into the system.

Depending upon the pressure within the well casing there may be a tendency for the gas and water mixture to solidify within the well casing 66, ESP 74 or first conduit 76. The temperature of water returning to the well casing can be regulated by a temperature control unit 90 connected to the return water or second conduit 84 to minimize this issue.

In addition to collecting methane gas from the separator 78 methane gas is drawn directly from the top of the well casing by a third conduit 92 that passes through a gas production monitor 94 which also delivers gas to a compressor storage system.

Depending on the downhole well casing pressure and the pressure within the ESP 74 the gas and water mixture 70 may tend to re-solidify during a pumping operation within the ESP intake (thus upstream of the ESP), within the ESP 74 itself or downstream of the ESP within the first conduit 76. In order to minimize this tendency a fourth conduit 96 is extended within the casing 66 and is operable to feed a chemical such as methanol, upstream of the ESP 74, directly into the ESP or downstream of the ESP to minimize reformation of methane hydrate within the system.

In producing methane from a gas hydrate, or other hydrocarbon production such as conventional natural gas or oil reserves, the production hydrocarbon flows from a subterranean formation and into a production well casing to be pumped to the surface for processing.

In such operations particulate material such as sand entrained within hydrocarbon fluid streams can enter access windows in the well casing along with the hydrocarbon for production and settle to the bottom of the well casing. As the volume of sand collects within the casing, efficiency of the production may be compromised, and, accordingly sand management within a production program is at least desirable and sometimes critical to efficient production.

Figure 4:
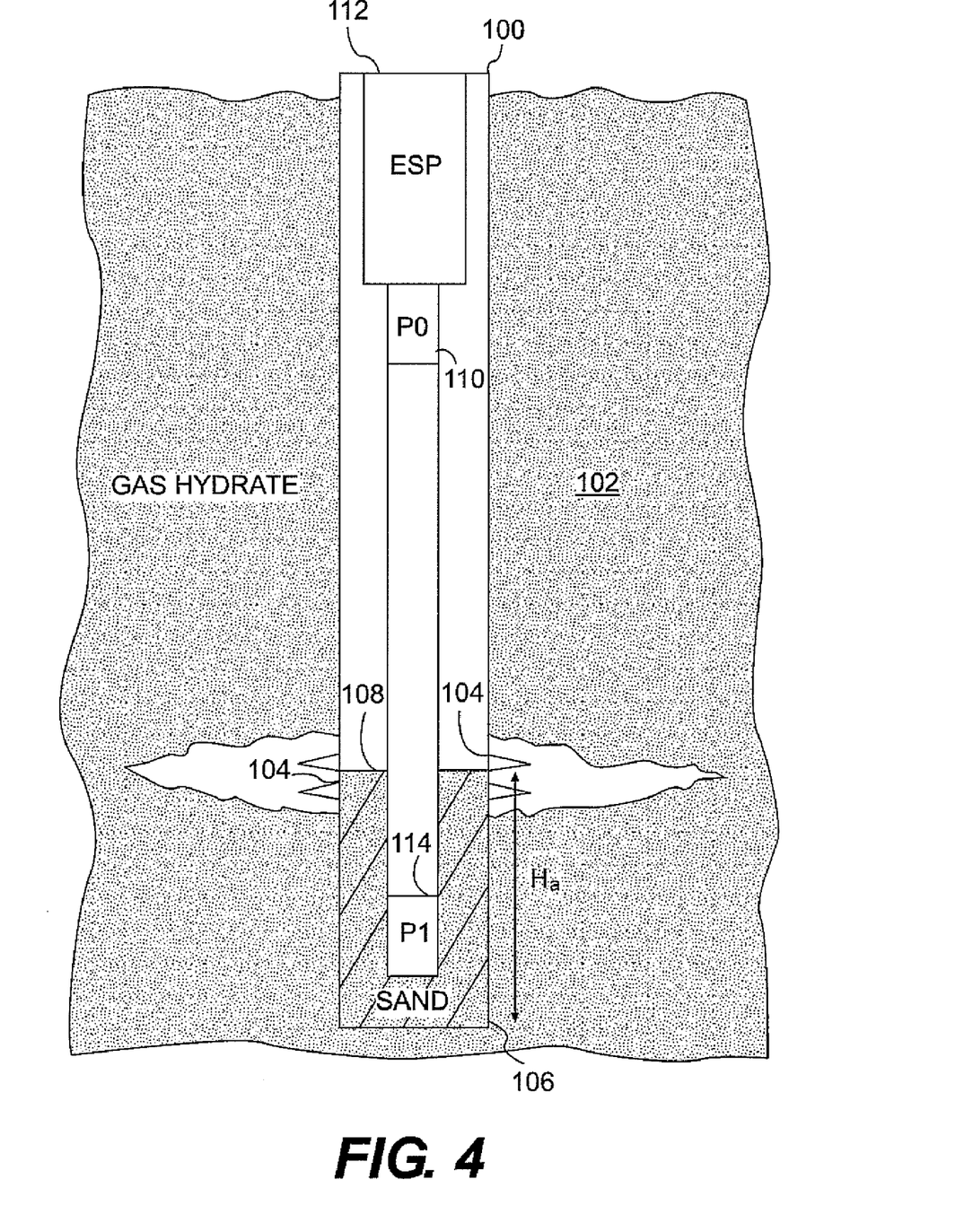
FIG. 4 is a schematic representation of one embodiment of the invention that includes two pressure sensors and the use of pressure noise variance between the two sensors to estimate the height of sand within the distal end of a well casing.

One embodiment of the disclosure for monitoring sand build-up is disclosed in FIG. 4. In this embodiment a well casing 100 is shown cemented within a well drilled into a gas hydrate production zone 102. The casing is fashioned with production windows 104 that are cut or blown through the side wall of the casing to permit ambient hydrocarbons, such as for example dissociated methane gas and water, to enter the well casing.

Sometimes entrained with incoming pressurized hydrocarbons and water is particulate matter such as sand 106. This relatively heavy sand tends to fall by gravity into a lowest portion of the well casing as illustrated in FIG. 4. Depending on the volume of sand that accumulates the sand-fluid interface 108 may reach the level of the well casing windows 104 and at least partially occlude the window openings and thus impair the efficiency of the hydrocarbon recovery.

Although techniques are know to prevent sand from entering the well casing system, over time particulate material can accumulate within the casing. In certain instances it has been desirable to allow sand to enter the casing to enable the sanding tendency in new formations. However, since there is production equipment that can be damaged by sand, as well as decreasing well efficiency, sand production needs to be detected and the level of sand accumulation determined to enable an operator to take preemptive management before the level of sand becomes problematic.

In the FIG. 4 embodiment, a first pressure sensor 110 is positioned at the bottom of a submersible pump 112 and a second pressure sensor or gauge 114 is positioned near the distal end of the well casing. Accordingly, downhole pressure at the submerged pump level and at near the distal end of the well casing is monitored.

In this pressure variance monitoring system of FIG. 4, a ripple, i.e., noise, is generated in the pressure readings. If the pressure reading is stable, the motor speed of the pump 112 is controlled to generate noise in the pressure reading. The sand layer 106 may be considered as a pressure filter, and the pressure response at the bottom sensor 114 is a function of the sand column height Ha when the well casing is vertical. Alternatively, for lateral drilling operations the accumulation of sand and a fluid-sand interface can be at an angle with respect to a vertical orientation. The sand column accumulation Ha may be estimated by analyzing the noise waveform variation, such as phase shift or amplitude variation.

Figure 5:
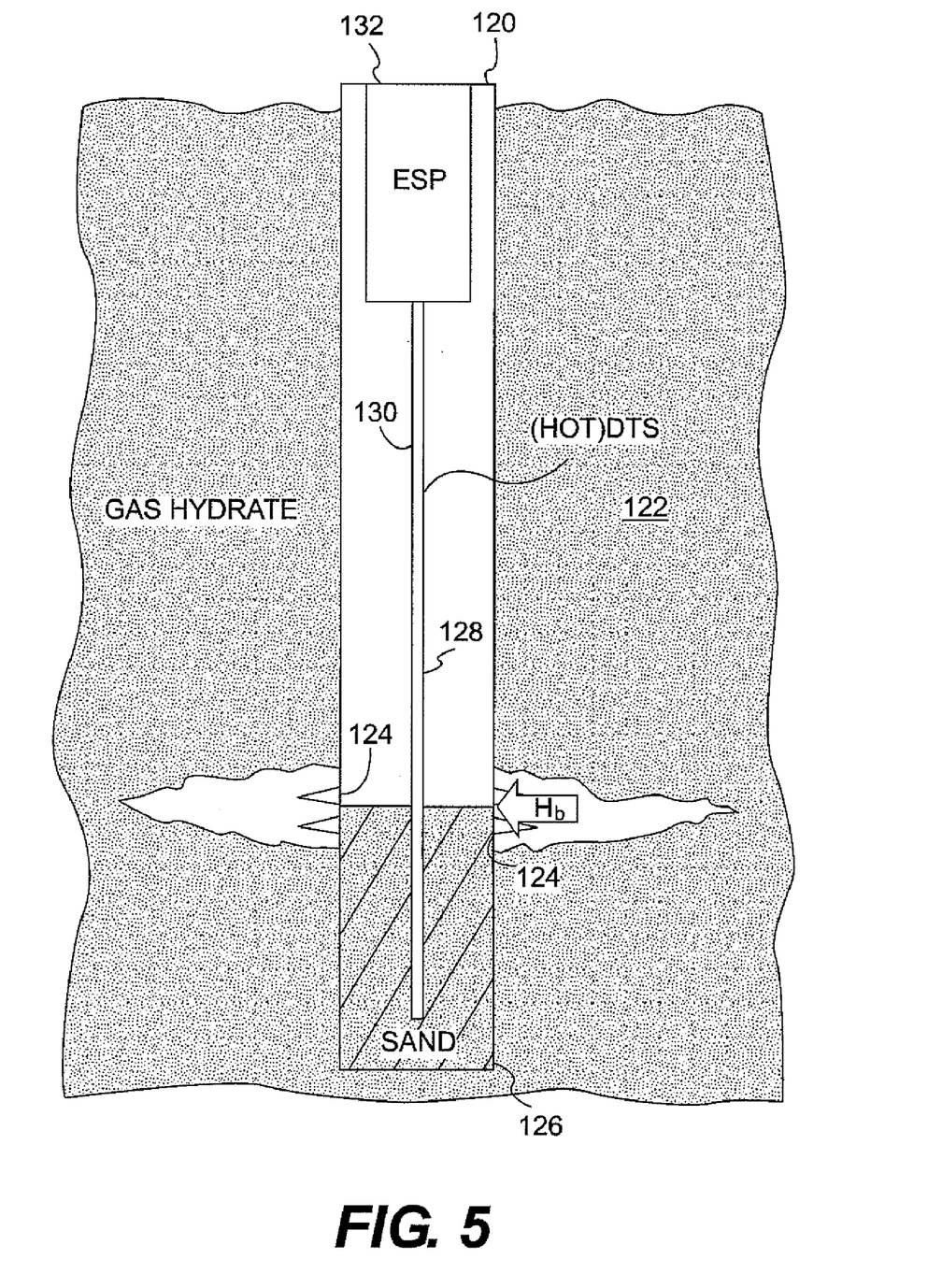
FIG. 5 is a schematic representation of another embodiment of the invention that discloses a distributed temperature sensing system for estimating the sand-fluid interface within a well casing.

Turning now to FIG. 5, a second embodiment of the disclosure is disclosed. In this embodiment, a well casing 120 is shown cemented into a borehole drilled into a hydrocarbon production zone such as a gas hydrate 122. Production windows 124 are cut into the casing to allow the flow of hydrocarbons into the well casing for recovery. As noted above sand 126 can also enter the well casing and collect by gravity at a lowermost location of the casing 120.

In this embodiment a continuous thermal characteristic measurement device 128, such as a distributed temperature sensing system (Hot-DTS), is installed, for example, below the completion string. The DTS is a fiber optic temperature sensor that is run within tubing 130 from the submersible pump 132 to a distal end of the well casing 120. By measuring the temperature or thermal characteristics, for example, thermal conductivity, of the surrounding material with the temperature sensing device 128 the position of the sand-fluid interface may be estimated. Methods and systems for distributed temperature sensing are disclosed in U.S. patent application Ser. No. 11/346,926 entitled "Systems and Methods of Downhole Thermal Property Measurement", filed on Feb. 3, 2006, and of common assignment with the subject application. The disclosure of this application is incorporated herein by reference in its entirety.

The tubing or cable 130 can have a built in heater section which can be turned on to create a more dramatic thermal conductivity difference at the sand-fluid interface Hb.

Figure 6:
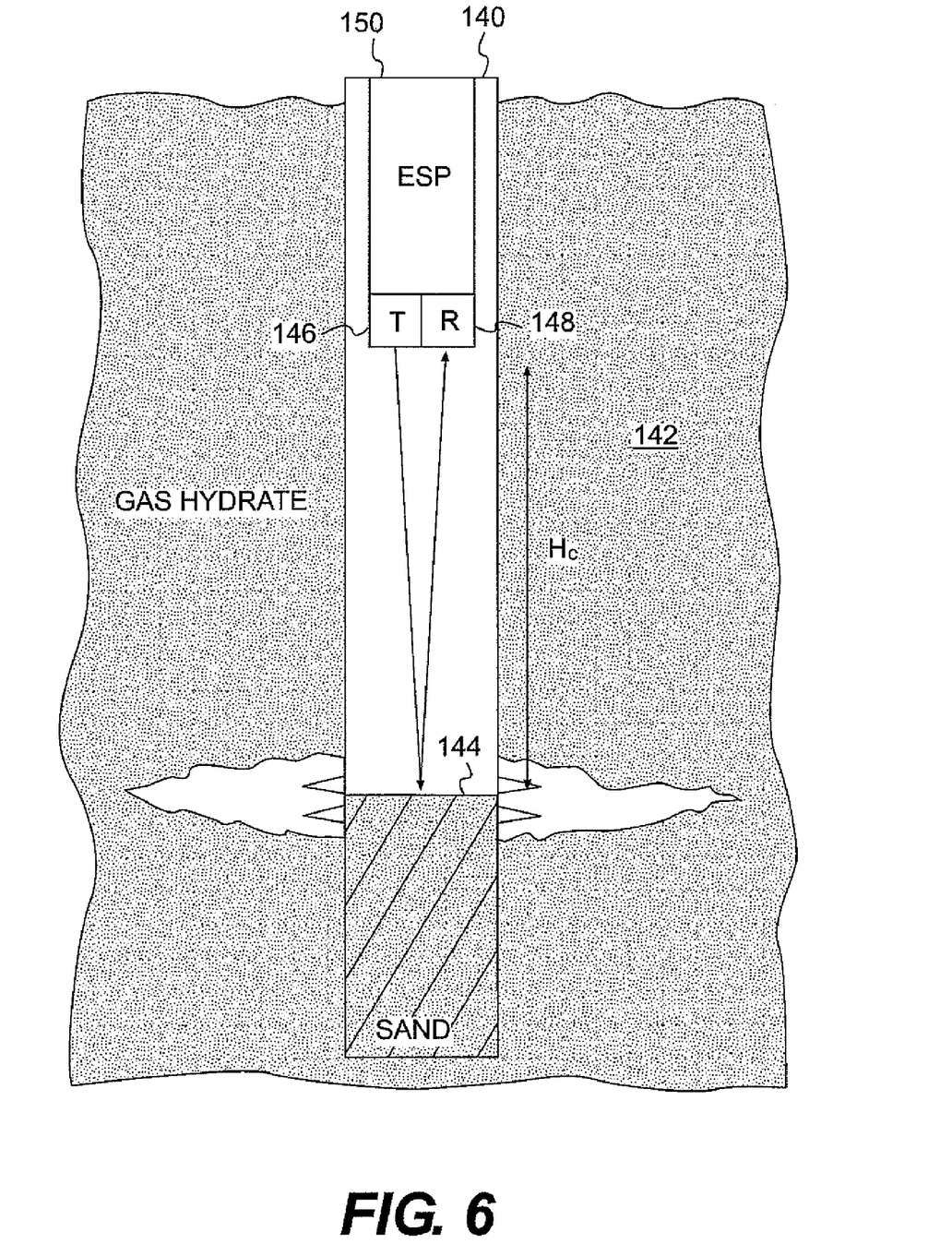
FIG. 6 is a schematic representation of yet another embodiment of the invention that includes an acoustic transmitter and receiver pair at the bottom of a completion string.

Another embodiment of the disclosure is depicted in FIG. 6. Here a well casing 140 is again shown cemented within a hydrocarbon production zone 142. In this embodiment the sand-fluid interface 144 is determined by the provision of an acoustic transmitter 146 and a receiver 148 connected to the submersible pump 150.

By observing the waveform of sound generated by the transmitter 146 and received by the receiver 148, the distance between the transmitter/receiver and the sand-fluid interface Hc may be estimated.

Figure 7:
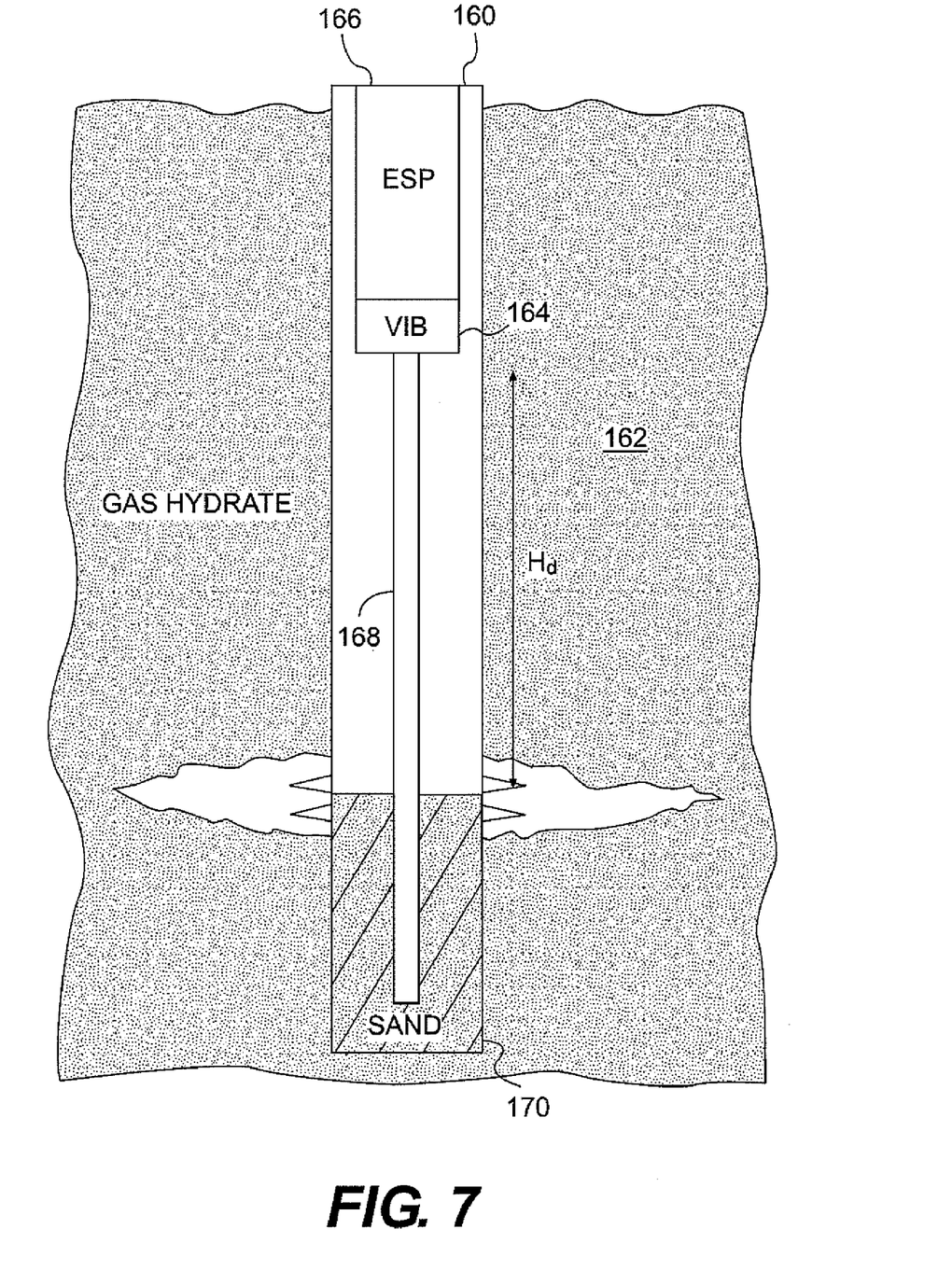
FIG. 7 is yet another embodiment and discloses a vibrator and vibrating bar installed below the completion string.

Turning now to yet another embodiment of the disclosure in FIG. 7 a similar well casing 160 is shown cemented into a hydrocarbon production zone 162. In this embodiment a vibrator 164 is connected to the base of a submersible pump 166 and a vibration bar 168 extends from the vibrator to the distal end of the well casing 166 and into sand 170 that has accumulated within the well casing. By observing the vibration mode of the bar, the position Hd of the sand-fluid interface below the vibrator 164 is estimated. In this, the vibrating bar response system is based on the damping factor of sand being higher than that of water. As shown in FIG. 7, the vibration mode of the bar 168 will vary with the depth change of the sand-fluid interface. Therefore, by observing the vibration mode of the bar, the fluid-sand ratio may be determined, which would indicate fluid/sand height.

In each of the above discussed embodiments a novel technique is utilized to monitor the level of sand within a well casing so the remedial action may be initiated as necessary or desirable.

In describing the invention, reference has been made to some embodiments and illustrative advantages of the disclosure. Those skilled in the art, however, and familiar with the subject disclosure may recognize additions, deletions, modifications, substitutions and other changes which fall within the purview of the subject claims.

What is claimed is:

1. A method for monitoring an incursion of particulate matter from a gas hydrate formation into a well casing used for the production of the gas hydrate comprising the steps of:
   drilling a well into a subterranean gas hydrate formation;
   installing a well casing within the well and into the gas hydrate formation;
   forming at least one opening through the side wall of the well casing for at least partially permitting depressurizing the gas hydrate formation to permit gas and water to flow from the formation into the well casing; and
   monitoring the accumulation of the particulate matter into the well casing through said at least one opening through the well casing sidewall.

2. A method for monitoring the incursion of particulate matter from a gas hydrate formation into the well casing used for the production of the gas hydrate as defined in claim 1 wherein said step of forming at least one opening comprises:
   forming a plurality of openings laterally through the sidewall of the well casing in the region of the gas hydrate formation.

3. A method for monitoring the incursion of particulate matter from a gas hydrate formation into the well casing used for the production of the gas hydrate as defined in claim 2 wherein said step of monitoring the accumulation of said particulate matter into the well casing further comprises the steps of:
   monitoring the downhole pressure within the well casing at a location adjacent a submersible pump within the well casing for pumping a mixture of gas and water from the well casing;
   monitoring the downhole pressure within the well casing at a location adjacent a distal end of the well casing; and
   analyzing the noise waveform variation between the pressure adjacent the submersible pump and at the distal end of the well casing to estimate the accumulation of particulate matter within the well casing.

4. A method for monitoring the incursion of particulate matter from a gas hydrate formation into the well casing used for the production of the gas hydrate as defined in claim 3 wherein said step of analyzing the noise waveform variation between the pressure adjacent the submersible pump and at the distal end of the well casing comprises the step of:
   analyzing a phase shift in the noise waveform of pressure readings between the pressure adjacent the submerged pump within the well casing and the distal end of the well casing.

5. A method for monitoring the incursion of particulate matter from a gas hydrate formation into the well casing used for the production of the gas hydrate as defined in claim 3 wherein said step of analyzing the noise waveform variation between the pressure adjacent the submersible pump and at the distal end of the well casing comprises the step of:
   analyzing an amplitude variation in the noise waveform of pressure readings between the pressure adjacent the submerged pump within the well casing and the distal end of the well casing.

6. A method for monitoring the incursion of particulate matter from a gas hydrate formation into the well casing used for the production of the gas hydrate as defined in claim 2 wherein said step of monitoring the accumulation of said particulate matter into the well casing further comprises the step of:
   monitoring the thermal characteristics of material within the well casing between the end of the submersible pump and the distal end of the well casing to determine the position of the particulate material and fluid interface within the well casing.

7. A method for monitoring the incursion of particulate matter from a gas hydrate formation into a well casing used for the production of the gas hydrate as defined in claim 6 and further comprising the step of:
   heating a fiber optic sensor cable within the well casing.

8. A method for monitoring the incursion of particulate matter from a gas hydrate formation into the well casing used for the production of the gas hydrate as defined in claim 2 wherein said step of monitoring the accumulation of said particulate matter into the well casing further comprises the steps of:
   sending an acoustic signal from the bottom of the submersible pump;
   receiving a reflected acoustic signal from the bottom of the submersible pump reflected from particulate material within the distal end of the well casing; and
   analyzing the waveform of the reflected acoustic signal for estimating the position of the particulate material and fluid interface within the well casing.

9. A method for monitoring the incursion of particulate matter from a gas hydrate formation into the well casing used for the production of the gas hydrate as defined in claim 2 wherein said step of monitoring the accumulation of said particulate matter into the well casing further comprises the steps of:
   extending a bar from a position below the submersible pump within the well casing and into particulate material collected within the distal end of the well casing;
   vibrating the bar extending into the particulate material; and
   analyzing the vibration mode of the bar for estimating the ratio of fluid to particulate material between the base of the submersible pump and the distal end of the well casing.

10. A method for monitoring an incursion of particulate matter from a subterranean formation into the well casing used for the production of a hydrocarbon comprising the steps of:
    drilling a well into a subterranean hydrocarbon formation;
    installing a well casing within the well and into the hydrocarbon formation;
    forming a plurality of openings through the side wall of the well casing for establishing fluid communication with the hydrocarbon formation; and
    monitoring the accumulation of the particulate matter into the well casing through said at least one opening through the well casing sidewall.

11. A method for monitoring the incursion of particulate matter from a subterranean formation into the well casing used for the production of a hydrocarbon as defined in claim 10 wherein said step of monitoring the accumulation of the particulate matter into the well casing further comprises the steps of:
    monitoring the downhole pressure within the well casing at a location adjacent a submersible pump within the well casing for pumping a hydrocarbon from the well casing;
    monitoring the downhole pressure within the well casing at a location adjacent a distal end of the well casing; and
    analyzing the noise waveform variation between the pressure adjacent the submersible pump and the pressure at the distal end of the well casing to estimate the accumulation of particulate matter within the well casing.

12. A method for monitoring the incursion of particulate matter from a subterranean formation into the well casing used for the production of a hydrocarbon as defined in claim 10 wherein said step of monitoring the accumulation of said particulate matter into the well casing further comprises the steps of:

monitoring the thermal characteristics of material within the well casing between the end of the submersible pump and the distal end of the well casing to determine the position of particulate material and fluid interface within the well casing.

13. A method for monitoring the incursion of particulate matter from a subterranean formation into the well casing used for the production of a hydrocarbon as defined in claim 10 wherein said step of monitoring the accumulation of the particulate matter into the well casing further comprises the steps of:

sending an acoustic signal from the bottom of the submersible pump;

receiving a reflected acoustic signal at the bottom of the submersible pump reflected from particulate material within the distal end of the well casing; and analyzing the waveform of the reflected acoustic signal for estimating the position of the particulate material and fluid interface within the well casing.

14. A method for monitoring the incursion of particulate matter from a subterranean hydrocarbon formation into the well casing used for the production of the hydrocarbon as defined in claim 10 wherein said step of monitoring the accumulation of the particulate matter into the well casing further comprises the steps of:

extending a bar from a position below the submersible pump within the well casing and into particulate material collected within the distal end of the well casing;

vibrating the bar extending into the particulate material; and analyzing the vibration mode of the bar for estimating the ratio of fluid to particulate material between the base of the submersible pump and the distal end of the well casing.

15. A system for determining the degree of incursion of particulate matter into a well casing used in the production of gas from a subterranean gas hydrate formation, said system comprising:

a first pressure sensor connected to a submersible pump positioned within the well casing for pumping gas and water out of the well casing; and a second pressure sensor connected at a distal end of the well casing, wherein measuring pressure noise variance between said first pressure sensor and said second pressure sensor provides at least an estimate of the accumulation of particulate material within the distal end of said well casing beneath the submersible pump.

\* \* \* \* \*